United States Patent [19]

Kajino et al.

[11] 4,117,520
[45] Sep. 26, 1978

[54] MAGNETIC TAPE CARTRIDGE RECORDING APPARATUS WITH MANUALLY ACTUATED TAPE THREADING AND TAPE REWIND

[75] Inventors: Jirou Kajino, Neyagawa; Kazumi Iwasaki, Moriguchi, both of Japan

[73] Assignee: Matsushita Electric Industrial Co., Ltd., Kadoma, Japan

[21] Appl. No.: 796,828

[22] Filed: May 13, 1977

[30] Foreign Application Priority Data

May 19, 1976 [JP] Japan .................. 51-58402

[51] Int. Cl.$^2$ ........................................... G11B 15/66
[52] U.S. Cl. ........................................ 360/95; 242/198
[58] Field of Search ................... 360/95, 85; 242/198

[56] References Cited

U.S. PATENT DOCUMENTS

| | | | |
|---|---|---|---|
| 3,373,951 | 3/1968 | Mazoyer | 360/95 |
| 3,823,896 | 7/1974 | Finkelstein | 360/95 |
| 3,902,680 | 9/1975 | Neff | 360/95 |
| 4,050,087 | 9/1977 | Kishi | 360/95 |

Primary Examiner—Robert S. Tupper
Attorney, Agent, or Firm—Wenderoth, Lind & Ponack

[57] ABSTRACT

A magnetic tape recording and/or reproducing apparatus wherein a magnetic tape is drawn out of a tape cartridge by tape drawing means by the movement from its inoperative position to its operative position, and is wound up onto one of the reels of the tape cartridge by turntable rotating means due to the movement of the tape drawing means from its operative position to its inoperative position.

5 Claims, 4 Drawing Figures

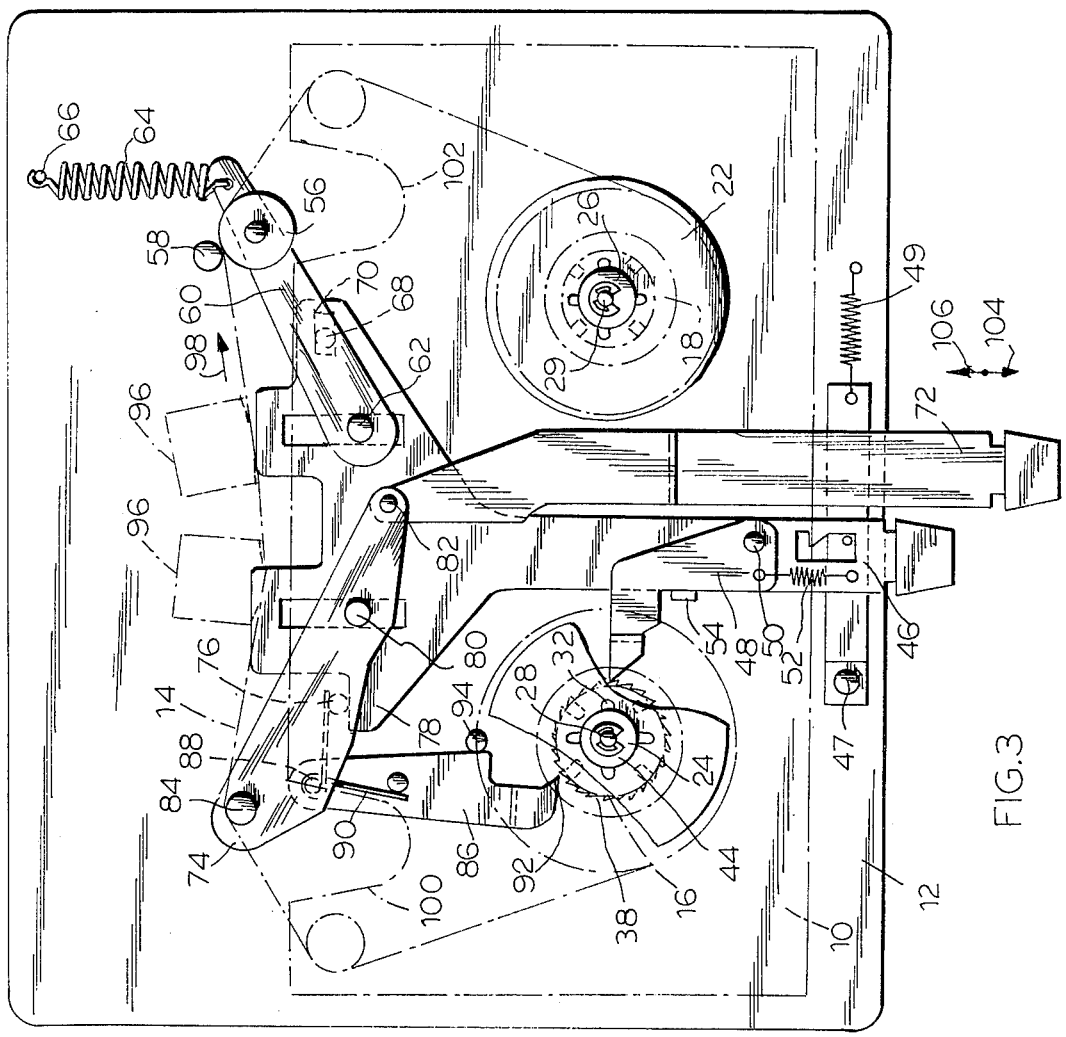
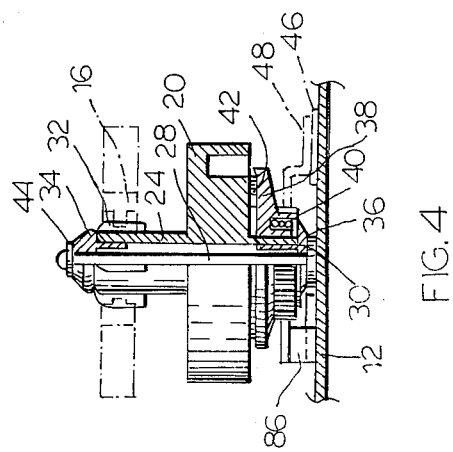

MAGNETIC TAPE CARTRIDGE RECORDING APPARATUS WITH MANUALLY ACTUATED TAPE THREADING AND TAPE REWIND

This invention relates generally to a tape recording and/or reproducing apparatus and more particularly to an apparatus wherein magnetic tape, which extends continuously between a supply reel and a take-up reel in a tape cartridge, can be drawn out of the tape cartridge and moved along a desirable tape path.

It is known that, as a result of improvement in magentic tapes and heads, magnetic tape recording and/or reproducing apparatus using a tape cartridge is now widely used and is a very compact apparatus which can be easily handled. However, in conventional tape recording and/or reproducing apparatus, it is required that magnetic heads be moved into the tape cartridge to contact the magnetic tape. This movement of the magnetic heads sometimes causes trouble in the lead wires attached to the magnetic heads and also makes it difficult to secure the magnetic heads in an accurate operative position.

For overcoming this problem, an improved tape recording and/or reproducing apparatus has been developed wherein the magnetic tape is drawn out of the tape cartridge and contacted with the magnetic heads secured on a chassis of the apparatus. In such magnetic tape recording and/or reproducing apparatus, the magnetic tape must be drawn back into the tape cartridge promptly before ejection of the cartridge from the apparatus. To solve this problem, the conventional tape recording and/or reproducing apparatus is provided with an unloading mechanism using relatively expensive electric elements such as a motor or a plunger.

It is a principal object of the present invention to provide an improved and useful tape recording and/or reproducing apparatus with an inexpensive and reliable unloading mechanism which overcomes the above described disadvantages.

Another object of the present invention is to provide an improved tape recording and/or reproducing apparatus wherein the magnetic tape which has been drawn out of the cartridge is securely drawn back into the tape cartridge in accordance with the rotation of a reel drive turntable at the time of an unloading operation.

Still another object of the present invention is to provide an improved tape recording and/or reproducing apparatus having a unique slip mechanism for preventing the tape from being subjected to excessive tape tension during an unloading operation.

Yet another object of the present invention is to provide an improved tape recording and/or reproducing apparatus having a back tension mechanism of simple construction which provides appropriate contact between the magnetic tape and magnetic heads.

These objects are achieved by providing a tape recording and/or reproducing apparatus according to the present invention.

Further objects and advantages of this invention will become apparent from the following detailed description considered in connection with the accompanying drawings, in which:

FIG. 3 is a plan view of the apparatus of FIG. 1 with the parts in position for carrying out a recording and/or reproducing operation; and FIG. 4 is a side view, partially in section, of a reel drive turntable forming part of the apparatus taken along the line 4—4 of FIG. 2.

Figure 1:
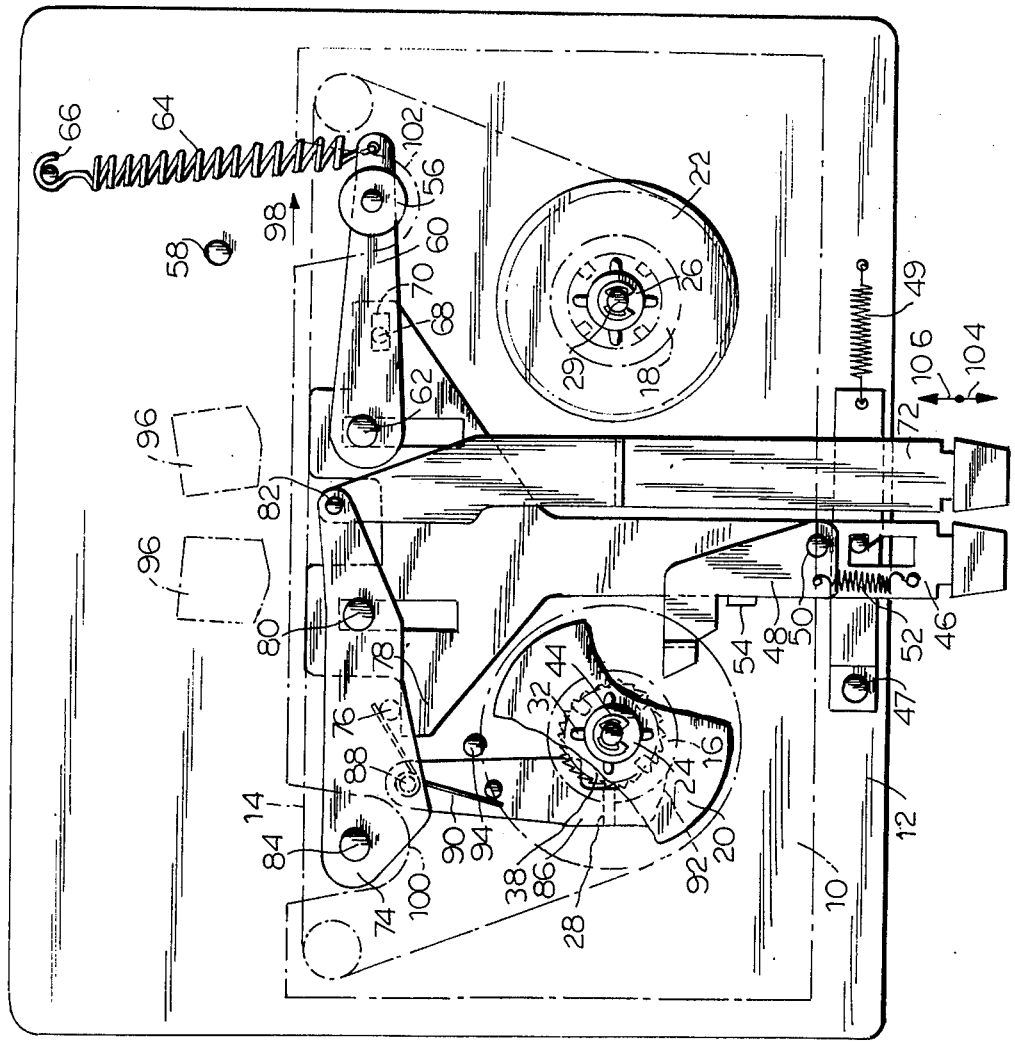
FIG. 1, is a schematic plan view of one embodiment of the tape recording and/or reproducing apparatus according to this invention, and illustrating the relative position of a tape cartridge, in dot-dash lines, which is positioned on the apparatus.

Referring now to the drawings, the construction and the operation of the magnetic tape recording and/or reproducing apparatus according to the present invention will be explained hereinafter.

A tape cartridge 10 is set on a chassis 12 as shown in dot-dash lines in FIG. 1. The tape cartridge 10 includes a magnetic tape 14 wound on and extending between a supply reel 16 and a takeup reel 18 which are rotatably mounted in the cartridge. The chassis 12 has a supply reel drive turntable 20 and a take-up reel drive turntable 22 rotatably mounted thereon. A pair of spindles 24 and 26 on the respective turntables are rotatably mounted on spaced-apart shafts 28 and 29 fixed on the chassis 12, and adapted to extend into the tape cartridge 10 to engage with the respective reels 16 and 18.

As shown in FIG. 4, the supply reel drive turntable 20 has a hub 30 at a lower portion thereof. The spindle 24 has a plurality of radially projecting carrier ribs 32 at the upper end thereof which are engagable with radial projections in a bore of the supply reel 16 in the tape cartridge. The supply reel drive turntable 20 is rotatably journaled on the shaft 28 by an upper cap 34 and a lower cap 36 clamped at respective ends of the spindle 24 and the hub 30.

A ratchet wheel 38 is rotatably mounted on the hub 30 coaxially with and independently from the supply reel drive turntable 20, and is urged upwardly by a compression spring 40 which is positioned between the lower cap 36 and the ratchet wheel 38 so as to press the felt ring 42 against a lower surface of the supply reel drive turntable 20. Therefore, the ratchet wheel 38 can drive the supply reel drive turntable 20 by frictional force exerted between the supply reel drive turntable 20 and the felt ring 42 (or between the felt ring 42 and the ratchet wheel 38). A retaining washer 44 is fastened at the upper end of the shaft 28 so as to restrict the upward axial movement of the supply reel drive turntable 20.

An operation control key 46 is slidably mounted on the chassis 12 by a suitable guide means (not shown) to move between an inoperative position shown in FIG. 1 and an operative position shown in FIG. 3. A bar 47 rightwardly urged by a spring 49 is slidably mounted on the chassis 12 by a suitable guide means (not shown) to latch the operation control key 46 in its inoperative position. A first bent arm 48 having a pointed free end is pivotably mounted on a stud 50 fixed on the operation control key 46, and is urged counterclockwise by a spring 52 into contact with a stop 54 on the operation control key 46.

A pinch roller 56 is rotatably mounted on a support arm 60 which is pivotally mounted on a shaft 62 fixed on the chassis 12. The pinch roller 56 is movable toward and away from the capstan 58 by the swinging motion of the support arm 60 about the shaft 62. The support arm 60 is urged to swing counterclockwise by a spring 64 connected between one end of said arm 60 and a hook 66 on the chassis 12. A pin 68 fixed on the bottom of the support arm 60 is inserted in slot 70 provided in the operation control key 46. The key 46 is biased by the spring 64 acting through the arm 60 and the pin 68. In the inoperative condition of the apparatus, the operation control key 46 holds the pinch roller 56 in an inoperative position spaced from the capstan and within a U-shaped recess 102 in the tape cartridge 10 as shown in FIG. 1. Upon setting of the tape cartridge 10 onto the apparatus, the magnetic tape 14 lying along an extended path along the upper front wall of the tape cartridge 10 will be brought into a position between the capstan 58 and the pinch roller 56.

Figure 2:
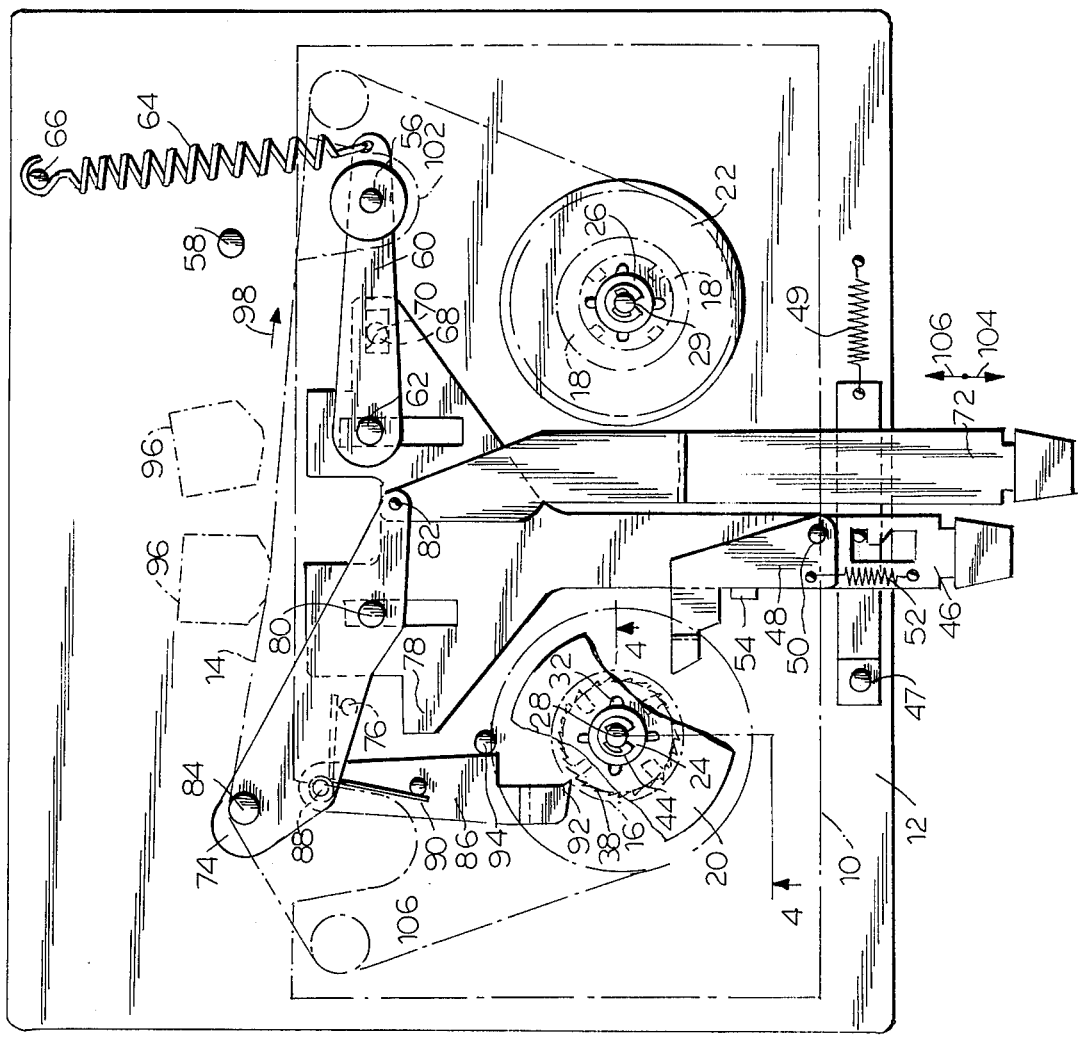
FIG. 2 is a schematic plan view of the apparatus of FIG. 1, showing the tape position when the tape is drawn out of the cartridge.

An unloading key 72 is slidably mounted on the chassis 12 by a suitable guide means (not shown), and is manually displaceable from a tape loading position shown in FIG. 2 to a tape unloading position shown in FIG. 1 or conversely from a tape unloading position shown in FIG. 1 to a tape loading position shown in FIG. 2. The unloading key 72 is held in either of these two positions by the friction of the guide means (not shown). A tape loading arm 74 is rotatably mounted on a shaft 80 extending upwardly from the chassis 12, and has a pin 76 secured thereto which is engageable with a projection 78 formed on the operation control key 46. One end of the tape loading arm 74 is connected to the unloading key 72 by a pin 82, and the other end has a tape guide pole 84 secured thereto. In the inoperative condition of the apparatus, the unloading key 72 is in its unloading position, as shown in FIG. 1, in which the tape loading arm 74 is shifted counterclockwise so as to position the tape guide pole 84 within a U-shaped recess 100 in the tape cartridge 10.

A second arm 86 having a pointed end portion 92 is pivotally mounted on a pin 88 which is fixed to the bottom of the tape loading arm 74 and is urged counterclockwise by a torsion spring 90. When the tape loading arm 74 is in the unloading position, as shown in FIG. 1, the second arm 86 has the pointed free end thereof pressed against the ratchet wheel 38 by the torsion spring 90.

Magnetic heads 96 for recording and reproducing signals on the magnetic tape 14 are secured on the chassis 12.

When an operator manually pulls the unloading key 72 to the direction of the arrow 104 from the position shown in FIG. 1, the tape loading arm 74 is rotated clockwise about the shaft 80 until the tape guide pole 84 draws the magnetic tape 14 out of the tape cartridge as shown in FIG. 1. During this movement of the tape loading arm 74, the second arm 86 is out of engagement with the ratchet wheel 38 due to the configuration of the ratchet tooth thereof. When the operator manually pushes the bar 47 leftwardly, the operation control key 46 moves in the direction of the arrow 106 as shown in FIG. 3 under the tension in spring 64, and the support arm 60 is rotated counterclockwise about the shaft 62 so that the pinch roller 56 draws the tape 14 out of the tape cartridge 10 and presses the tape 14 against the capstan 58 as shown in FIG. 3. Simultaneously, the projection 78 on the key 46 drives the pin 76 to swing the tape loading arm 74 clockwise about the shaft 80 so that the tape guide pole 84 draws the tape 14 out of the tape cartridge 10. At the same time, the second arm 86 is also displaced to the direction of the arrow 106, but it does not rotate the ratchet wheel 38 because the pointed end portion 92 thereof is not brought into meshing engagement with the ratchet wheel 38 during the movement of the tape loading arm 74 from the inoperative position to the operative position due to the configuration of the ratchet tooth of the wheel 38. While the operation control key 46 is in the operative position, the pointed end portion 92 of the second arm 86 does not contact the ratchet wheel 38 and the counterclockwise swinging motion of the second arm 86 is prevented by a stop 94 fixed on the chassis 12 as shown in FIG. 2. The first arm 48 is also displaced to the direction of the arrow 106 in order to prevent the clockwise rotation of the ratchet wheel 38 by the engagement of arm 48 with ratchet wheel 38.

Due to the rotation of the capstan 58, the magnetic tape 14 is moved to the direction of the arrow 98, and is wrapped around the take-up reel 18 which is rotated clockwise by the suitable drive means (not shown). On the other hand, the supply reel 16 and the supply reel drive turntable 20 will rotate clockwise due to the movement of the magnetic tape 14.

Since the rotation of the ratchet wheel 38 is prevented by the first arm 48 as described above, the slippage will occur between the supply reel drive turntable 20 and the ratchet wheel 38. Even under this condition, the supply reel drive turntable 20 can rotate smoothly due to the frictional braking load caused by the slip mechanism between the supply reel drive turntable 20 and the felt ring 42 (or between the felt ring 42 and the ratchet wheel 38). This serves to exert desired back tension on the magnetic tape 14 and contact the tape 14 against the magnetic heads 96 under the desired pressure.

When the operator manually pulls back the operation control key 46 in the direction of the arrow 104 as shown in FIG. 2, the support arm 60 is rotated clockwise about the shaft 62 so as to release the pressure of the pinch roller 56 against the biasing force of the spring 64, but the tape loading arm 74 still remains in its operative position. Thus, the pinch roller 56 is retracted into the position within the U-shaped recess 102 of the tape cartridge 10. At the same time, the engagement between the ratchet wheel 38 and the first arm 48 is released.

When the operator next manually pushes the unloading key 72 in the direction of the arrow 106, the tape loading arm 74 is rotated counterclockwise about the shaft 80 until the tape guide pole 84 comes into a position in the U-shaped recess 100 of the tape cartridge as shown in FIG. 1. This movement of the tape loading arm 74 causes the second arm 86 to move back in the direction of the arrow 104 and engage with the ratchet wheel 38 to rotate the same due to the configuration of the ratchet tooth thereof. Consequently, the supply reel drive turntable 20 is rotated counterclockwise so that the magnetic tape 14 which has been drawn out of the tape cartridge 10 is wound on the supply reel 16.

It must be noticed that the length of the magnetic tape which can be wound upon the supply reel 16 by the unloading motion just described above should be greater than length of magnetic tape which has been drawn out of the tape cartridge 10 by pine 84 moving away from the cartridge. However, excessive tension is not exerted on the magnetic tape 14 even if the ratchet wheel 38 is overrotated after accomplishment of rewinding of the magnetic tape which has been drawn out of the tape cartridge 10, because, as described above, the rotation of the ratchet wheel 38 is transmitted to the supply reel drive turntable 20 through the slip mechanism.

The apparatus thus makes it possible to restore the magnetic tape 14, which has been drawn out of the tape cartridge 10, onto the supply reel 16 safely and reliably when the tape loading arm 74 is moved back to its inoperative position. The above-described simple slip mechanism may also exert desirable tension on the magnetic tape 14 during the recording and/or reproducing operation. It is obvious that the magnetic tape 14 drawn out of the tape cartridge 10 can be easily wound on the take-up reel 18 by the movement of the unloading key 72.

It is apparent that various modifications may be made without departing from the spirit of the invention. The above described specific example is intended merely to illustrate the various facets in one embodiment of the invention, the scope of which is limited only by the following claims.

| 10 | tape cartridge | 62 | shaft |
|----|----|----|----|
| 12 | chassis | 64 | spring |
| 14 | magnetic tape | 66 | hock |
| 16 | supply reel | 68 | pin |
| 18 | tape-up reel | 70 | slot |
| 20 | supply reel drive turntable | 72 | unloading key |
| 22 | take-up reel drive turntable | 74 | tape loading arm |
| 24 | spindle | 76 | pin |
| 26 | spindle | 78 | projection |
| 28 | shaft | 80 | shaft |
| 29 | shaft | 82 | pin |
| 30 | hub | 84 | tape guide pole |
| 32 | carrier rib | 86 | second nail-shaped arm |
| 34 | upper cap | 88 | pin |
| 36 | lower cap | 90 | torsion spring |
| 38 | ratchet wheel | 92 | one end portion |
| 40 | compression spring | 94 | stopper |
| 42 | felt ring | 96 | magnetic heads |
| 44 | retaining washer | 98 | arrow sign |
| 46 | operation control key | 100 | recess |
| 47 | bar | 102 | recess |
| 48 | first nail-shaped arm | 104 | arrow sign |
| 49 | spring | 106 | arrow sign |
| 50 | stud | | |
| 52 | spring | | |
| 54 | stopper | | |
| 56 | pinch roller | | |
| 58 | capstan | | |
| 60 | support arm | | |

What is claimed is:

1. A magnetic tape recording and/or reproducing apparatus for recording and/or reproducing signals on a magnetic tape wound on reels contained in a tape cartridge, said apparatus comprising: a pair of reel drive turntables engageable with said reels for rotating said reels; tape moving means connected to said drive turntables for moving said magnetic tape at a constant speed; operation control means connected to said tape moving means for controlling the operation of said tape moving means; a magnetic head for recording and/or reproducing signals on said magnetic tape and spaced laterally away from the normal path of said tape between the reels in said tape cartridge when said tape cartridge is in said apparatus; tape drawing means movable from an inoperative position to an operative position for drawing said magnetic tape out of said tape cartridge and against said magnetic head; and turntable rotating means frictionally connected to one of said reel drive turntables and driven by said drawing means in its movement from the operative position to the inoperative position for rotating one of said reel drive turntables in a direction to wind the magnetic tape drawn out of the cartridge by said tape driving means onto said one reel.

2. An apparatus according to claim 1, wherein said turntable rotating means comprises: a rotatable ratchet wheel mounted coaxially on and connected frictionally to one of said reel drive turntables; and a drive member connected to said tape drawing means and engaged with said ratchet wheel for rotating said turntable in a direction to wind said magnetic tape onto said one reel when said tape drawing means moves from its operative position to its inoperative position.

3. An apparatus according to claim 2, further comprising means on said operation control means for engaging said ratchet wheel for preventing said ratchet wheel from rotating in response to the movement of said operation control means from its inoperative position to its operative position, whereby a predetermined back tension is exerted on the magnetic tape due to the frictional force between said ratchet wheel and said one reel drive turntable while the tape is moved at the constant speed by said tape moving means.

4. An apparatus according to claim 3, wherein said means on said operation control means is a latch member which is engaged with said ratchet wheel to prevent the rotation thereof when said operation control means is in its operative position.

5. An apparatus according to claim 2, wherein said rotatable ratchet wheel is mounted coaxially on said one reel drive turntable and has a spring connected thereto urging it toward said one reel drive turntable, and a felt ring between said ratchet wheel and said one reel drive turntable and pressed against said one reel drive turntable by said ratchet wheel.

* * * * *